US010019258B2

(12) United States Patent
Voigt et al.

(10) Patent No.: US 10,019,258 B2
(45) Date of Patent: Jul. 10, 2018

(54) HARDWARE ASSISTED SOFTWARE VERSIONING OF CLUSTERED APPLICATIONS

(71) Applicant: Hewlett Packard Enterprise Development LP, Houston, TX (US)

(72) Inventors: Douglas L. Voigt, Boise, ID (US); Donald E. Bollinger, Monte Sereno, CA (US); Daniel Juergen Gmach, Palo Alto, CA (US); Dejan S. Milojicic, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/301,969

(22) PCT Filed: Apr. 29, 2014

(86) PCT No.: PCT/US2014/035969
§ 371 (c)(1),
(2) Date: Oct. 5, 2016

(87) PCT Pub. No.: WO2015/167480
PCT Pub. Date: Nov. 5, 2015

(65) Prior Publication Data
US 2017/0132000 A1     May 11, 2017

(51) Int. Cl.
*G06F 9/44* (2018.01)
*G06F 9/445* (2018.01)
(Continued)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS 7,305,669 B2     12/2007    Roush et al.
7,318,074 B2 *    1/2008    Iyengar ............ G06F 17/30902
                                                       707/690

(Continued)

OTHER PUBLICATIONS

"Share Data Between Hive Versions," Aws.Amazon.Com, Mar. 31, 2009, 1 Page, http://docs.aws.amazon.com/ElasticMapReduce/latest/DeveloperGuide/emr-dev-share-data-hive-0.5-0.7.html.

(Continued)

*Primary Examiner* — Daxin Wu
(74) *Attorney, Agent, or Firm* — Mannava & Kang, P.C.

(57) ABSTRACT

Examples relate to providing hardware assisted software versioning for clustered applications. In one example, virtualized global memory is accessible to application servers that provide a clustered application, where the clustered application includes multiple versions of a common data structure. After one of the application servers stores an element that is compatible with one version of the common data structure, other versions of the common data structure are located in the virtualized global memory. The element is then invalidated in the other versions of the common data structure to prevent access and translated directly in the virtualized global memory to the other versions of the common data structure. At this stage, the element can be validated in the other versions of the common data structure for access.

15 Claims, 6 Drawing Sheets

(51) Int. Cl.
*G06F 8/71* (2018.01)
*G06F 8/65* (2018.01)

(56) References Cited

U.S. PATENT DOCUMENTS

| | | |
|---|---|---|
| 7,430,735 B1 | 9/2008 | Balakrishnan et al. |
| 8,505,027 B2 | 8/2013 | Warner et al. |
| 2002/0123992 A1* | 9/2002 | Goldick .................... G06F 8/71 |
| 2003/0061501 A1* | 3/2003 | Yamada ................ G06F 12/1408 |
| | | 713/193 |
| 2003/0074426 A1* | 4/2003 | Dervin ..................... G06F 8/60 |
| | | 709/220 |
| 2005/0177826 A1* | 8/2005 | Miller ...................... G06F 8/71 |
| | | 717/170 |
| 2006/0036656 A1 | 2/2006 | Mercer |
| 2007/0255738 A1 | 11/2007 | D'Costa |
| 2010/0049751 A1* | 2/2010 | Giampaolo ......... G06F 11/1474 |
| | | 707/E17.044 |
| 2012/0054744 A1* | 3/2012 | Singh ..................... G06F 21/53 |
| | | 718/1 |
| 2012/0197994 A1 | 8/2012 | Beerbower et al. |
| 2013/0246932 A1* | 9/2013 | Zaveri .................... G06F 3/017 |
| | | 715/740 |
| 2013/0297577 A1 | 11/2013 | Brown |
| 2014/0052700 A1 | 2/2014 | Vanderspek |

OTHER PUBLICATIONS

PCT Search Report/Written Opinion ~ Application No. PCT/US2014/035969 dated Jan. 16, 2015 ~ 11 pages.

\* cited by examiner

HARDWARE ASSISTED SOFTWARE VERSIONING OF CLUSTERED APPLICATIONS

BACKGROUND

A clustered application is typically distributed across server nodes on a network that communicate and coordinate via messaging. Normally, all the server nodes of the clustered application should be upgraded simultaneously so that the server nodes can continue to communicate using the same data formats. If data formats change during the upgrade process, then there may be downtime during the upgrade.

BRIEF DESCRIPTION OF THE DRAWINGS

The following detailed description references the drawings, wherein.

DETAILED DESCRIPTION

As detailed above, server nodes of clustered applications are typically upgraded simultaneously to ensure that the communications between server nodes use compatible data structures. During an upgrade when multiple versions of applications are executing, data translation can occur during remote procedure calls between server nodes. Such translations are not suitable for online upgrades of large scale applications that either directly access shared data in a global memory space or rapidly exchange data images using remote direct memory access (RDMA).

To allow for the translations, multiple versions of data structures and modifying the structures independently are common in the art. In most cases, the versions of the data structures that are used for work in progress are either shortly merged back into a common version or discarded depending on the clustered application. Embodiments disclosed herein extend on the ability to create multiple versions of data structures by allowing each version to represent its own rendition of the same data, where the multiple versions are maintained indefinitely through modification by various versions of the clustered application.

In some examples, virtualized global memory is accessible to application servers that provide a clustered application, where the clustered application includes multiple versions of a common data structure. After one of the application servers stores an element that is compatible with one version of the common data structure, other versions of the common data structure in global memory are identified. The elements in those other versions are then invalidated to prevent access. The element is then translated appropriately for each version of the data structure, and stored in each version of the data structure in the virtualized global memory. At this stage, the element in the other versions can be validated for access by the requesting server.

Figure 1:
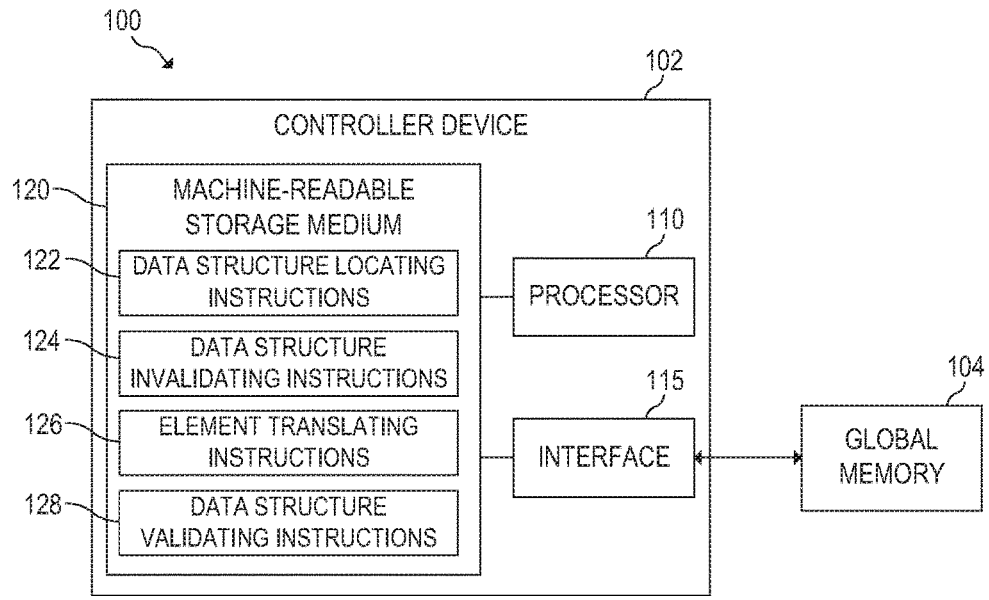
FIG. 1 is a block diagram of an example controller device for providing hardware assisted software versioning for clustered applications.

Referring now to the drawings, FIG. 1 is a block diagram of an example system 100 including a controller device 102 and global memory 104 for providing hardware assisted software versioning for clustered applications. Controller device 102 may be any computing device (e.g., field programmable gate array, memory controller, etc.) with access to global memory 104 of a clustered application. In the embodiment of FIG. 1, controller device 102 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to provide hardware assisted software versioning for clustered applications, as described below. As an alternative or in addition to retrieving and executing instructions, processor 110 or interface 115 may include one or more electronic circuits comprising a number of electronic components for performing the functionality of one or more of instructions 122, 124, 126, 128.

Interface 115 may include a number of electronic components for communicating with global memory 104 of a clustered application (not shown). For example, interface 115 may be memory bus or any other physical connection interface suitable for communication with global memory 104. In operation, as detailed below, interface 115 may be used to write and read data to and from global memory 104.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), and the like. As described in detail below, machine-readable storage medium 120 may be encoded with executable instructions for providing hardware assisted software versioning for clustered applications.

Data structure locating instructions 122 identify a change to a versioned data structure. In other words, after the data structure is changed, other versions of the same data structure (in use by different versions of the clustered application) are identified for translation. Accordingly, any number of versions of the data structures for multiple versions of the clustered application may be identified.

Data Structure invalidating instructions 124 invalidates the stale versions of the data structure to be inaccessible because the stale versions of the updated data structure have not been updated with the new data until the translation of the element has been completed. In some cases, the translation of the element may also be queued when the element is invalidated.

Element translating instructions 126 translates the element from the changed data structure to the other versions of the data structure. The translation is performed directly in global memory 104 so that it can be performed at "memory speed" without having to transmit data over a network. For example, the translation may be performed using a bit mask to expand or contract the element (i.e., arithmetic derivation)

to be compatible with another version of the data structure. In another example, the translation may be performed using a function that is capable of performing more complex translations. In this example, the function may be microcoded or implemented into controller device 102. The translation ensures that the data element is compatible for access by the other versions of the clustered application.

Data Structure validating instructions 128 validates the updated data structures for access. After the updated data structure is validated, it is accessible to all servers that are running the other versions of the clustered application. The translation of the element ensures that the most recent data is accessible in all versions of the data structure. If any version of the data structure is updated with new data, all other versions of the data structure will again be invalidated until they are translated.

Figure 2A:
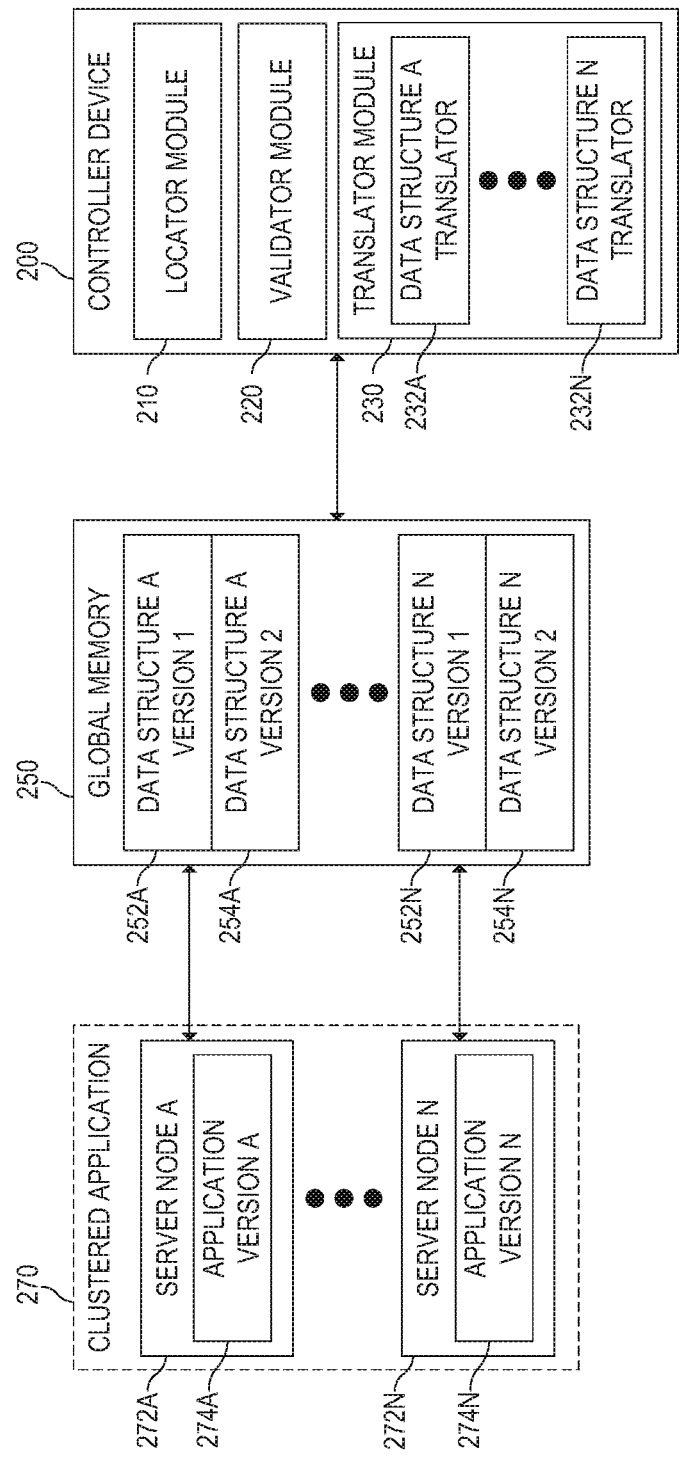
FIGS. 2A-2C are block diagrams of an example controller device in communication with global memory of a clustered application for providing hardware assisted software versioning.

FIG. 2A is a block diagram of an example controller device 200 in communication with global memory 250 of a clustered application 270 for providing hardware assisted software versioning. As illustrated, controller device 200 may include a number of modules 210-230. Each of the modules may include a series of instructions encoded on a machine-readable storage medium and executable by a processor of the controller device 200. In addition or as an alternative, each module may include one or more hardware devices including electronic circuitry for implementing the functionality described below.

Similar to controller device 102 of FIG. 1, controller device 200 may be a field programmable gate array, memory controller, or any other device suitable for executing the functionality described below. As detailed below, controller device 200 may include locator module 210, validator module 220, and translator module 230.

Locator module 210 determines the memory addresses in global memory 250 for all associated data structures (e.g., data structure A 252A, 254A; data structure N 252N, 254N) when clustered application 270 writes a data element of a versioned data structured. For example, locator module 210 may use the sizes of the different data structures to offset a changed data structure and determine the associated data structures. In another example, a locator table is used to maintain records for each of the data structure versions, where a unique key associated with the changed data structure can be used to determine the offsets of the associated data structures. Additional details related to locator module 210 are described below with respect to FIG. 2B.

Validator module 220 maintains the state of versioned data structures (e.g., data structure A 252A, 254A; data structure N 252N, 254N). Possible states of data structures include "latest," "refresh needed," "up to date," "write in progress," and "error." When an element is written to a data structure, the data structure is designated as latest while associated data structures are designated as refresh needed. After each version of a data structure has been updated to account for the written element, that data structure can be designated as up to date. The work in progress state is used for memory protocols that support a commit event, where work in progress denotes that a partial update of an element is in progress. The error state can, for example, indicate that conflicting write operations have been performed.

Translator module 230 translates a data element between different versions of a data structure (e.g., data structure A 252A, 254A; data structure N 252N, 254N). The translation can be performed by, for example, shifting bits of the element to convert the element from one version to another (i.e., arithmetic derivation) or executing a function with version-aware functionality. If multiple versions of the data structure are invalid (i.e., having a state of refresh needed), translator module 230 may translate the changed data structure to each of the associated data structures. Translator module may include a translator (e.g., data structure A translator 232A, data structure N translator 232N) for each data structure (e.g., data structure A 252A, 254A; data structure N 252N, 254N) in global memory 250. Additional details related to translator module 230 are described below with respect to FIG. 2C.

Global memory 250 includes various application data structures (e.g., data structure A 252A, 254A; data structure N 252N, 254N) with multiple versions that are associated with multiple versions (e.g., application version A 274A, application version N 274N) of the clustered application 270. Further, global memory 250 is accessible by all server nodes (e.g., server node A 272A, server node N 272N) of clustered application 270. For example, global memory 250 may be distributed shared memory that includes physical separate memory that can be addressed as one address space.

Clustered application 270 is a distributed software application that is configured to execute on multiple server nodes (e.g., server node A 272A, server node N 272N). Each server node (e.g., server node A 272A, server node N 272N) may be configured with a different version (e.g., application version A 274A, application version N 274N) of the clustered application 270.

Figure 2B:
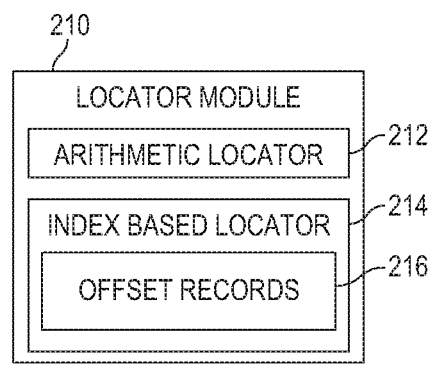

In FIG. 2B, a detailed block diagram of locator module 210 is shown. Locator module 210 includes arithmetic locator 212 and index based locator 214. One or more locators (e.g., arithmetic locator 212, index based locator 214) may be included in locator module 210 according to the corresponding data structures. In this case, arithmetic locator 212 may be configured to interact with data structure A 252A, 254A, and index based locator 214 may be configured to interact with data structure N 254A, 254N.

Arithmetic locator 212 is configured with an element size for each version of a data structure (e.g., data structure A version 1 252A, data structure N version 2 254A). For example, when an element of one version of a data structure is to be located, the offset into that version's data structure is divided by the element size for that version, and the result is then multiplied by the element size of the target version to obtain the offset into the target version of the data structure. Arithmetic locator 212 is best suited for applications where corresponding data structure elements are allocated in the same order in every version and are all the same size within each version. In some cases, the use of arithmetic locator 212 assumes that new records either replace old ones in all versions or are extended contiguously onto the end of the data structure.

Index based locator 214 uses an index based on a unique element key to identify data structures (e.g., data structure A 252A, 254A; data structure N 252N, 254N). For example, when an element in one version of a data structure is to be located, a unique key is located in the element of that version using an offset for that version that is configured into index based locator 214, and the key is then located in offset records 216 of index based locator 214 so that the offset of the corresponding element can be found for any other version of the data structure. In this example, a key length for the data structure is also configured into index based locator 214. Index based locator 214 should be notified of record insertions prior to the first access to the new record so that it can be added to the index.

Figure 2C:
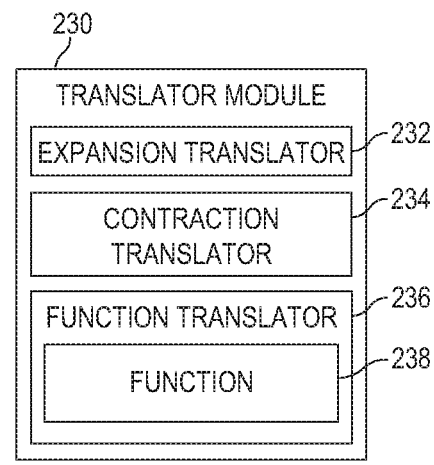

In FIG. 2C, a detailed block diagram of translator module 230 is shown. Translator module 230 includes expansion translator 232, contraction translator 234, and function translator 236. One or more translators (e.g., expansion translator 232, contraction translator 234, function translator 236) may be included in translator module 230 according to the corresponding data structures. In this case, expansion translator 232 may be configured to interact with data structure A 252A, 254A, contraction translator 234 may be configured to interact with data structure N 254A, 254N, and function translator 236 may be configured to interact with another data structure (not shown). Accordingly, translator module 230 may be configured to select one of the available translators 232, 234, 236 based on the data structure versions involved in the requested translation.

Expansion translator 232 and contraction translator 234 are inverse translators that provide simple data structure changes (e.g., arithmetic derivation) in which the order of an element's content is not changed. Expansion translator 232 uses an expansion bit map that is the length of the destination element of the target version of a data structure. For each "1" in the expansion bit map, the next bit in the source element of the initial version fills the next bit in the destination element. For each "0" in the expansion bit map, a "0" bit is inserted into the destination element. The expansion bit map allows fields in the element to be expanded with 0's. After expansion, a second mask may be applied that is "OR'ed" into the destination so that selected inserted 0's can be set to 1's in the event that their default values are not 0.

Contraction translator 234 uses a contraction bit map that is the size of the larger element, the source element. Each bit in the source that has a corresponding "0" in the contraction bit map is removed from the bit stream on the way to the destination element. Further, bits that should be adjusted in place can be changed to 0 or 1 with the AND and OR masks respectively.

Function translator 236 includes an arbitrary function 238 for handling more complex translations. Arbitrary function 238 can be microcoded or implemented in controller device 200 to achieve memory speed; otherwise, page faults may be necessary to allow time for function execution on a processor.

Figure 3:
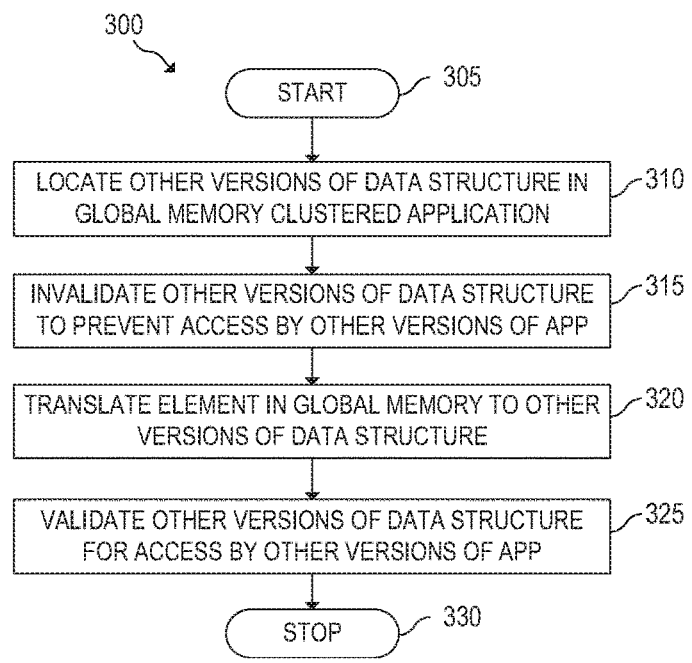
FIG. 3 is a flowchart of an example method for execution by a controller device for providing hardware assisted software versioning for clustered applications.

FIG. 3 is a flowchart of an example method 300 for execution by a controller device 102 for providing hardware assisted software versioning for clustered applications. Although execution of method 300 is described below with reference to controller device 102 of FIG. 1, other suitable devices for execution of method 300 may be used such as controller device 200 of FIG. 2A. Method 300 may be implemented in the form of executable instructions stored on a machine-readable storage medium, such as storage medium 120, and/or in the form of electronic circuitry.

Method 300 may start in block 305 and continue to block 310, where controller device 102 locates a changed element in version of the data structure. The global memory is accessible to multiple server nodes that are providing the clustered application (i.e., a distributed system). In block 315, the other versions of the data structure are invalidated to be inaccessible by other versions of the clustered application. Thus, any server executing the other versions of the clustered application will be unable to access the modified data structure until the translation of the element has been completed.

In block 320, controller device 102 translates the element from the changed data structure to the other versions of the data structure. The translation is performed directly in global memory without network communications, where controller device 102 is physically connected to the global memory. In block 325, each of the other versions of the data structure is validated for access by the other versions of the clustered application. After another version is validated, it is accessible to all the server nodes that are running the corresponding version of the clustered application. Method 300 may then continue to block 330, where method 300 may stop.

Figure 4:
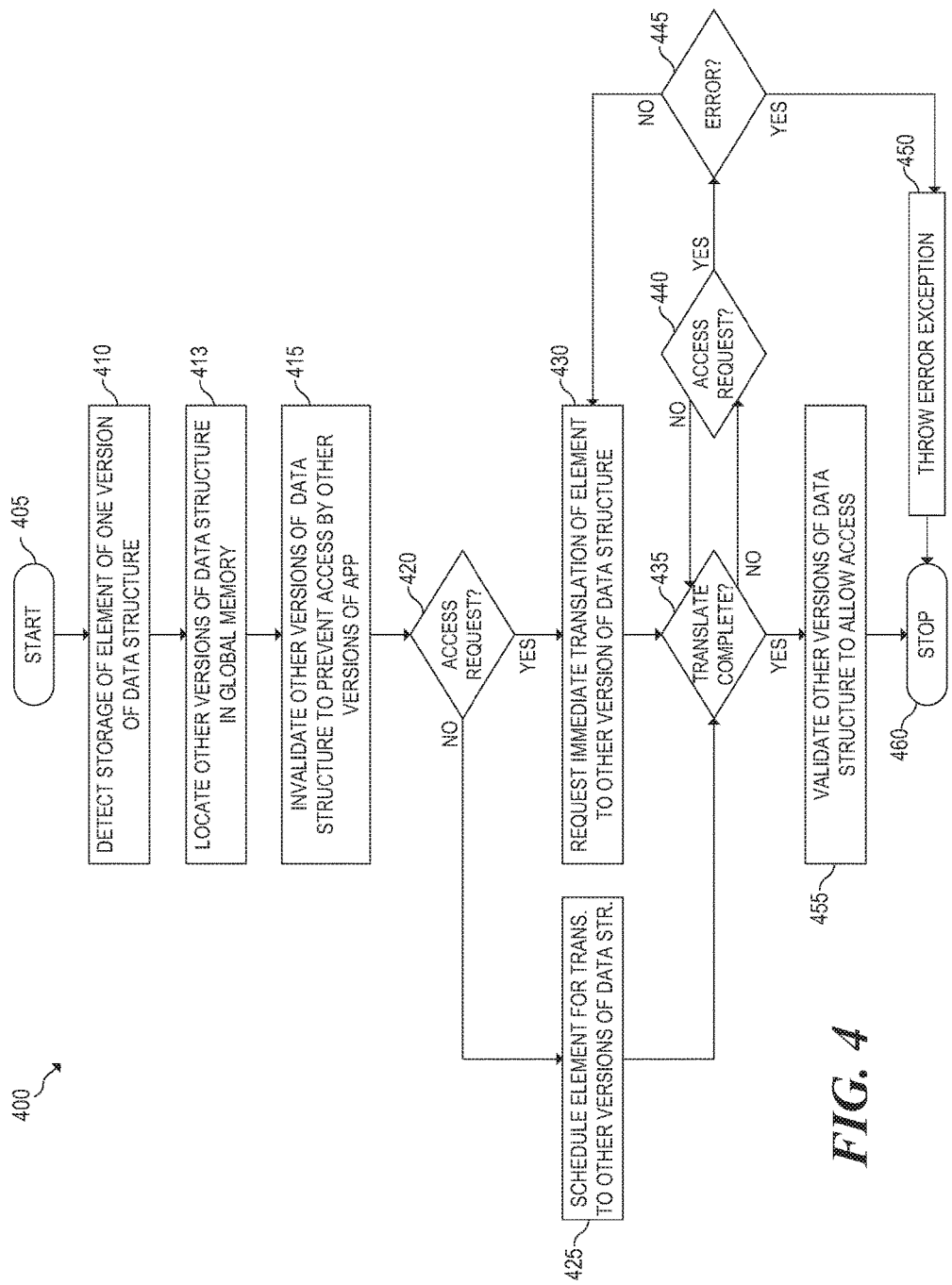
FIG. 4 is a flowchart of an example method for execution by a controller device for translating an element of a data structure between multiple versions.

FIG. 4 is a flowchart of an example method 400 for execution by a controller device 200 for translating an element of a data structure for multiple software versions. Although execution of method 400 is described below with reference to controller device 200 of FIG. 2A, other suitable devices for execution of method 400 may be used such as controller device 102 of FIG. 1. Method 400 may be implemented in the form of executable instructions stored on a machine-readable storage medium and/or in the form of electronic circuitry.

Method 400 may start in block 405 and continue to block 410, where controller device 200 detects a change to an element of a versioned data structure. The change can be an instantiation or a modification of the element of one version of the data structure. In response to detecting a change in an element in one version, other versions of the same data structure can be identified in block 413. A new version of the data structure may have been, for example, created during the development of a new version of the clustered application. In this case, the new version data structure may include properties that are not included in earlier versions of the data structure or vice versa (i.e., properties may be deprecated).

In block 415, the other versions of the data structure are invalidated to be inaccessible. In block 420, controller device 200 determines if access has been requested to other versions of the changed data structure. If access has not been requested, the element is scheduled for translation to the other versions of the data structure in block 425. For example, the translation request may be added to a queue that is processed by available translators of controller device 200.

If access has been requested for another version of the data structure, an immediate translation of the element to the other version of the data structure is requested in block 430. In block 435, controller device 200 determines if the translation of the element to all other versions is complete. If the translation is not complete, method 400 proceeds to block 440, where controller device 200 again determines if access to another version of the data structure has been requested. If access has not been requested, method returns to block 435.

If access has been requested, method 400 proceeds to block 445, where controller device 200 determines if an error has occurred. Error determination is made by checking to see if the access is a change to a version of the data structure that has yet to be translated. If the untranslated version of the data structure has not been changed then an error has not occurred, so method 400 returns to block 430, where controller device 200 requests immediate translation of the element to the untranslated version of the changed data structure. If the untranslated version of the data structure has been changed then an error has occurred, so controller device 200 throws an exception in block 450. For example, an error may occur if conflicting commits have been performed on the element.

If the translation has been completed, method 400 proceeds to block 455, where controller device 200 validates the element for access to all versions of the clustered application. Method 400 then proceeds to block 460, where method 400 may stop.

Figure 5A:
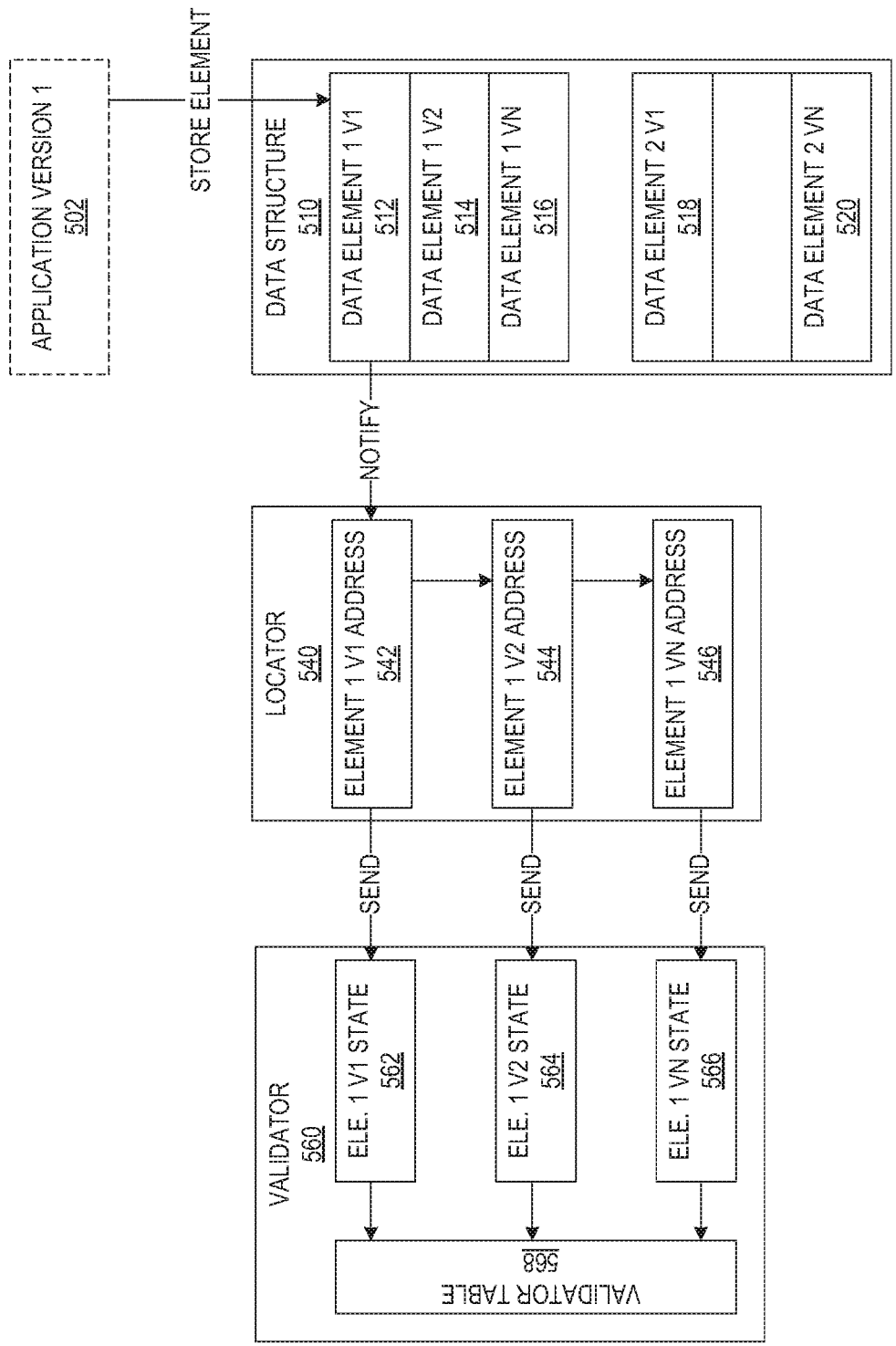
FIG. 5A is a block diagram of an example workflow for controller management during a write operation by a clustered application.

FIG. 5A is a block diagram of an example workflow for controller management during a write operation by a clustered application. Initially, application version 1 502 stores an element of data structure 510. In this example, data structure elements 512-520 are contiguous in a memory address space; however, elements may comprise physically noncontiguous memory combined with virtualized memory. As shown, data element 1 v1 512 of data structure 510 is stored, which triggers a notification to locator 540. With the element 1 v1 address 542, locator 540 determines element 1 v2 address 544 and element 1 vn address 546.

Locator 540 provides the addresses 542, 544, 546 to validator 560 that updates the corresponding state 562, 564, 566 of each data element in validator table 568. In this example, element 1 v1 562 state is set to latest while element 1 v2 564 and element 1 vn 566 are set to refresh needed. For memory pages accessing the data structures, state information may also be tracked at a memory page level (not shown) to accelerate normal reads in addition to the finer grained validator table 568 that is in support of translation. The refresh needed values in the validator table 568 trigger a translator (not shown) to translate the stored element to data element 1 v2 514 and data element 1 vn 516 as described below with respect to FIG. 5B.

Figure 5B:
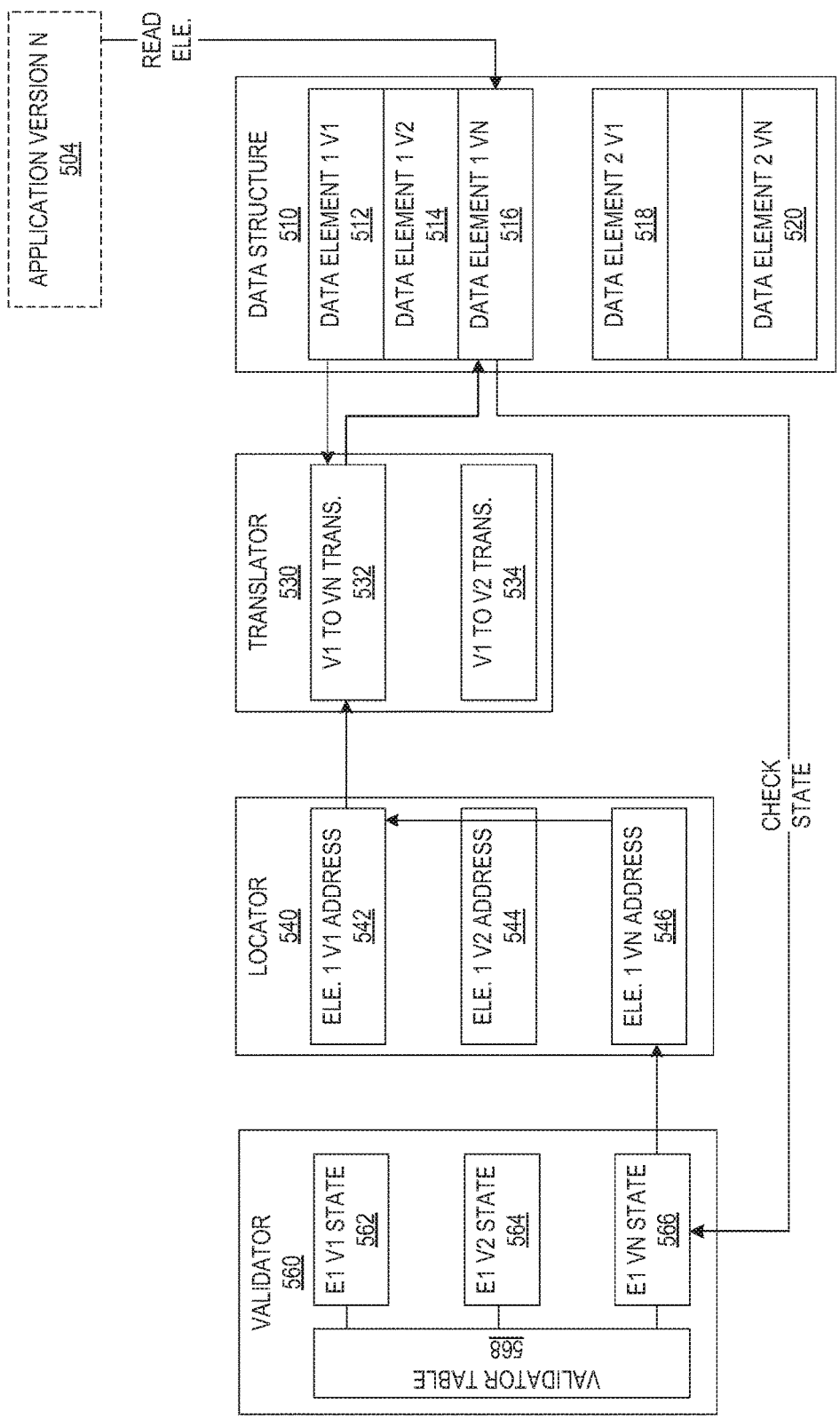
FIG. 5B is a block diagram of an example workflow for controller management during a read operation by a clustered application.

FIG. 5B is a block diagram of an example workflow for controller management during a read operation by a clustered application. Initially, application version N 504 reads data element 1 vn 516. The flow then proceeds to check the validator state for element 1 version N 566. In this case, the validator is checked first because the location of the version being read is already known, and the validator already holds the state that determines the read flow. In some cases, this check can be performed at a memory page level to expedite cases where no refresh is needed. If page level validity is not checked or fails then a finer grain granularity check is performed using validator table 568. A benefit of validator table 568 is a reduction in metadata space. Validator table 568 is stored in non-volatile memory (NVM) for cases where data structure 510 is stored in NVM.

If the fine grained validity check indicates the need for a refresh, then locator 540 is used to find the memory address of element 1 version 1 542 that contains the most recent data. Translator 530 is provided with the memory address of element 1 version 1 542 and element 1 version N 546 to perform the translation. Specifically, version 1 to version n translator 532 is provided with the memory addresses and proceeds to translate the most recent value in element 1 version 1 542 to element 1 version N 546. At this stage, element 1 version N 546 can proceed to be validated and read by application version N 504. In addition to the on-demand refresh process described above, a background process may use the state information in the validator to read further records that should be refreshed.

Validator 560 is responsible for maintaining the state of each data element in each version 512-520. However, in some cases, metadata is not retained for every version of every data element. For example, data elements that are up to date are not tracked as this is the most common and default state. In order to expedite read access to data that is up to date, a validity bit is maintained for each memory page indicating whether or not all of the data elements overlapping that memory page are up to date. If any are not up to date, then a finer grain check ensues. Whenever a version of a data element is returned to the up to date state, all pages that overlap that element in that version are checked to see if that was the last element in the page awaiting a refresh. If it is the last element awaiting a refresh, then the validity bit is reset for that entire page.

The table of element validity state information is most conveniently accessed via a page number index. Read and write accesses use the page number addressed by the access to locate the validity entries for data elements in the table related to that page. The validity entries are then checked to determine which entry overlaps the exact address of the access. The state of the data element in the version being accessed is contained in the overlapping validity entry, if any. The lack of an entry indicates that the corresponding element is up to date.

In some cases, data structure versioning as described herein can be applied to applications that are not clustered. For example, different applications that share a common dependency (e.g., linked library, web service, etc.) may use data structure versioning to account for different versions of the common dependency.

The foregoing disclosure describes a number of example embodiments for providing hardware assisted software versioning for clustered applications. In this manner, the embodiments disclosed herein enable multiple software version to be maintained in a clustered application by monitoring and translating versioned data structures directly in global memory of the clustered application.

We claim:

1. A system for providing hardware assisted software versioning for clustered applications, the system comprising:
   virtualized global memory storing a plurality of versions of a data structure of a cluster application, wherein the cluster application is provided by a plurality of application servers; and
   a device operatively connected to the virtualized global memory, the device including a processor and a non-transitory computer readable medium storing instructions that when executed by the processor cause the processor to:
   in response to a writing of a data element in a first version of the common data structure by one of the plurality of application servers, determine addresses of other versions of the data structure in the virtualized global memory;
   based on the addresses of the other versions of the data structure in the virtualized global memory, render the other versions of the data structure in the virtualized global memory invalid to prevent the other versions of the data structure from being accessed;
   while the other versions of the data structure in the virtualized global memory are invalid, translate the data element written in the first version of the data structure to the other versions of the data structure directly in the virtualized global memory; and
   after the data element has been translated to the other versions of the data structure in the virtualized global memory, render the other versions of the data structure in the virtualized global memory valid to allow the other versions of the data structure to be accessed.

2. The system of claim 1, wherein the data element is translated in response to a request to access the data element from a requesting server of the plurality of application servers.

3. The system of claim 1, wherein, to translate the data element directly in the virtualized global memory, the instructions are to cause the processor to utilize a bit mask to expand or contract the data element in the other versions of the data structure in the virtualized global memory.

4. The system of claim 1, wherein, to translate the data element directly in the virtualized global memory, the instructions are to cause the processor to perform an arithmetic derivation of the data element in the other versions of the data structure in the virtualized global memory.

5. The system of claim 1, wherein, to translate the data element directly in the virtualized global memory, the instructions are to cause the processor to invoke a translation interrupt that triggers a software function to translate the data element.

6. The system of claim 1, wherein, to translate the data element to each version of the other versions of the data structure in the virtualized global memory, the instructions are to cause the processor to:
    invoke a selected translation, and
    identify the selected translation from a plurality of translators based on the first version of the data structure and a target version of the other versions of the data structure, wherein the plurality of translators comprises an arithmetic derivation translator and a function translator.

7. A method for providing hardware assisted software versioning for clustered applications, the method comprising:
    receiving a notification that one of a plurality of application servers has written an element in a first version of a data structure of a cluster application, wherein the plurality of application servers provides the clustered application that comprises a plurality of versions of the data structure;
    in response to the element being written in the first version of the data structure, determining, by a processor of a computing device, addresses of other versions of the data structure in virtualized global memory of the clustered application;
    based on the addresses of the other versions of the data structure in the virtualized global memory, rendering, by the processor, the other versions of the data structure in the virtualized global memory invalid to prevent the other versions of the data structure from being accessed;
    while the other versions of the data structure in the virtualized global memory are invalid, translating, by the processor, the element to the other versions of the data structure directly in the virtualized global memory; and
    after the element has been translated to the other versions of the data structure in the virtualized global memory, rendering, by the processor, the other versions of the data structure in the virtualized global memory valid to allow the other versions of the data structure to be accessed.

8. The method of claim 7, wherein the element is translated in response to a request to access the element from a requesting server of the plurality of application servers.

9. The method of claim 7, wherein translating the element directly in the virtualized global memory includes using a bit mask to expand or contract the element in the other versions of the data structure in the virtualized global memory.

10. The method of claim 7, wherein translating the element directly in the virtualized global memory includes invoking a translation interrupt that triggers a software function to translate the element.

11. The method of claim 7, wherein translating the element to each version of the other versions of the data structure in the virtualized global memory includes invoking a selected translation, and wherein the method further comprises:
    identifying the selected translation from a plurality of translators based on the first version of the data structure and a target version of the other versions of the data structure, wherein the plurality of translators comprises an arithmetic derivation translator and a function translator.

12. A non-transitory machine-readable storage medium encoded with instructions executable by a processor for providing hardware assisted software versioning for clustered applications, the non-transitory machine-readable storage medium storing instructions that when executed by the processor cause the processor to:
    receive a notification that an initial server of a plurality of application servers has written an element in a first version of a data structure of a cluster application, wherein the plurality of application servers provides the clustered application that comprises a plurality of versions of the data structure;
    in response to the writing of the element in the first version of the data structure, determine addresses of other versions of the data structure in virtualized global memory;
    based on the addresses of the other versions of the data structure in the virtualized global memory, render the other versions of the data structure in the virtualized global memory invalid to prevent the other versions of the data structure from being accessed;
    while the other versions of the data structure in the virtualized global memory are invalid and in response to a request to access the element from a requesting server of the plurality of application servers, translate the element written in the first version to the other versions of the data structure directly in the virtualized global memory; and
    after the element has been translated to the other versions of the data structure in the virtualized global memory, render the other versions of the data structure valid to allow the other versions containing the element to be accessed.

13. The non-transitory machine-readable storage medium of claim 12, wherein to translate the element directly in the virtualized global memory, the instructions are to cause the processor to use a bit mask to expand or contract the element in the other versions of the data structure in the virtualized global memory.

14. The non-transitory machine-readable storage medium of claim 12, wherein, to translate the element directly in the virtualized global memory, the instructions are to cause the processor to invoke a translation interrupt that triggers a software function to translate the element.

15. The non-transitory machine-readable storage medium of claim 12, wherein, to translate the element to each version of the other versions of the data structure in the virtualized global memory, the instructions are to cause the processor to:
    invoke a selected translation, and
    identify the selected translation from a plurality of translators based on the first version of the data structure and a target version of the other versions of the data structure, wherein the plurality of translators comprises an arithmetic derivation translator and a function translator.

* * * * *